June 15, 1948.  R. F. JOHNSON  2,443,459
REVERSIBLE MOTOR
Filed Sept. 26, 1946
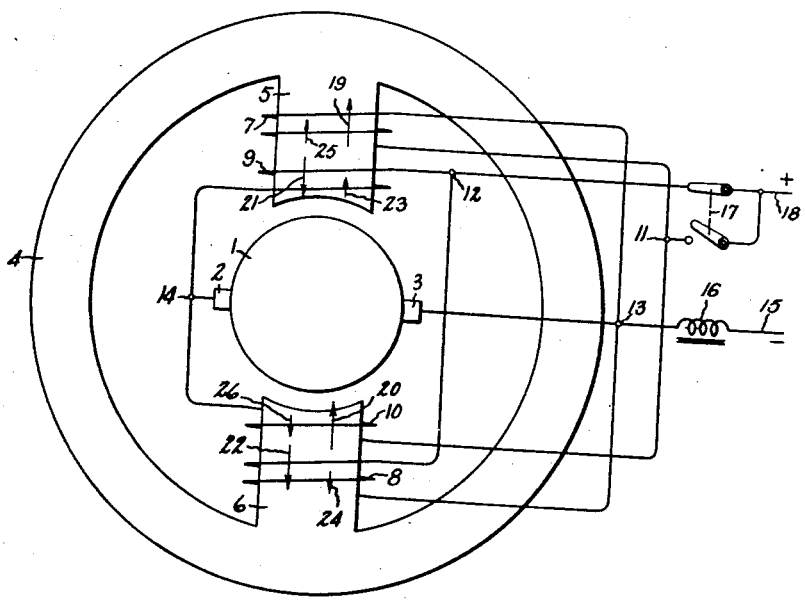
Inventor:
Robert F. Johnson,
by Browell S. Mack
His Attorney.

Patented June 15, 1948

2,443,459

UNITED STATES PATENT OFFICE 2,443,459

REVERSIBLE MOTOR

Robert F. Johnson, Fort Wayne, Ind., assignor to General Electric Company, a corporation of New York Application September 26, 1946, Serial No. 699,428

9 Claims. (Cl. 318—297)

My invention relates to dynamoelectric machines and particularly to a reversible motor in which reversible rotation is obtained by selectively energizing the field exciting windings of the machine to provide opposite resultant excitation for opposite directions of rotation of the machine.

An object of my invention is to provide an improved reversible motor construction.

Another object of my invention is to provide an improved excitation system for a reversible motor.

Further objects and advantages of my invention will become apparent and my invention will be better understood from the following description referring to the accompanying drawing, and the features of novelty which characterize my invention will be pointed out with particularity in the claims annexed to and forming part of this specification.

The drawing schematically illustrates a reversible motor provided with an embodiment of my invention.

In the illustrated arrangement of my invention, a reversible motor is shown as provided with an armature 1 of any suitable conventional type to which current is adapted to be supplied through suitable brushes 2 and 3 which are adapted to be connected to a source of electric power supply for energization of the machine. In this construction, the armature comprises the rotatable member of the motor, and a stationary member also is provided having a magnet frame 4 of any suitable conventional type on which a plurality of pole pieces 5 and 6 are arranged for supplying the desired excitation to the motor. In order to simplify the diagram, only one pair of pole pieces 5 and 6 has been illustrated and all the field exciting windings shown in relation to this pair of pole pieces can be multiplied if a multiple set of pairs of pole pieces is desirable. Excitation is adapted to be supplied to the motor by a pair of shunt field exciting windings 7 and 8 arranged respectively on the pole pieces 5 and 6 for providing components of excitation thereto of opposite polarity. The motor is adapted to operate as a compound machine and is provided with a pair of series field exciting windings 9 and 10 arranged respectively on the pole pieces 5 and 6 such that the components of excitation supplied thereby to each pair of pole pieces is cumulative to each other. In order to obtain the desired opposite directions of rotation of the motor, an arrangement is provided for selectively connecting the field exciting windings in sets to provide opposite resultant excitation to the motor for the opposite directions of rotation thereof. This is obtained by connecting the terminal 11 of the shunt field exciting winding 7 on the pole piece 5 in series with the terminal 11 of the series field exciting winding 10 on the other pole piece 6, and similarly connecting the terminal 12 of the shunt field exciting winding 8 on the pole piece 6 in series with a terminal 12 of the series field exciting winding 9 on the other pole piece 5, as well as connecting together the corresponding terminals 13 of the shunt field exciting windings 7 and 8 and the corresponding terminals 14 of the series field exciting windings 9 and 10 to form two parallel circuits with these sets of field exciting windings. With this arrangement, the series field exciting winding terminals 14 which are connected together are also connected in series with the armature through the brush 2, while the other brush 3 of the armature is connected to one side 15 of a source of electrical power supply, either directly or through a series connected exciting coil 16 of an electromagnetic brake of any desirable type. The terminal 13 of the two shunt field exciting windings 7 and 8 is connected to the terminal of the armature formed by the brush 3 and through the electromagnetic brake coil 16 to the side 15 of the source of electrical power supply. In this arrangement, reversible excitation for the motor is obtainable by a selective connecting system which includes a double pole switch 17 connected to the other side 18 of the source of electrical power supply for selectively connecting the terminals 11 and 12 forming the connections between the shunt and series field exciting windings of the two parallel circuits to this other side 18 of the source of electrical power supply, thereby selectively providing opposite resultant excitations to the motor for opposite directions of rotation thereof. This selective connecting arrangement, including the double pole switch 17, is such that only one of the poles of the switch 17 connects selectively one of the interconnecting terminals 11 and 12 between the shunt and series windings and is adapted to energize by this connection one of the shunt field exciting windings 7 or 8 directly in shunt across the source of electrical power supply and also the series field exciting winding 10 or 9 of the corresponding parallel circuit in series with the armature for providing a resultant cumulative excitation to the pole pieces of the motor, as indicated by the relatively large arrows 19 and 20 or 21 and 22, respectively, and for energizing the field exciting windings of the other parallel circuit to provide components of excitation of the same polarity to all of the pole pieces, as indicated by the relatively smaller arrows 23 and 24 or 25 and 26, respectively, thereby providing components of excitation of the same polarity to all of the pole pieces with substantially no resultant excitation therefrom to the motor. With such an arrangement, a shunt field exciting winding on one of the pole pieces is connected in shunt across the source of electrical power supply, and a series field exciting winding on another pole piece of each pair of pole pieces is connected in series with the armature and arranged to provide a resultant cumulative excitation to the motor, while the series field exciting winding on the first pole piece and the shunt field exciting winding on the second pole piece of each pair of pole pieces is connected in series circuit relation with each other for providing substantially equal and the same polarity components of excitation to each of the two pole pieces, thereby substantially neutralizing each other. Another feature of the arrangement of the field exciting windings which has been found to facilitate the provision of the desired components of excitation to this machine is the arrangement of all of the series field exciting windings to provide components of excitation which are cumulative to each other, and the arrangement of the shunt field exciting windings to provide opposing excitation to each other, as can be seen by the relationship of the arrows which indicate the direction of magnetic excitation provided by these field exciting windings under the various selective energizations thereof through the selective double pole switch 17. With this arrangement, the same magnitude of excitation is provided to the motor for both directions of rotation, thereby enabling the motor to develop substantially the same torque for either direction of rotation, with a relatively simple control obtainable through a relatively simple double pole connecting switch and a particular field arrangement and connection.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A reversible motor having an armature member and a field member with a pair of shunt field exciting windings arranged respectively on a pair of pole pieces, a pair of series field exciting windings arranged respectively on said pole pieces, and means for selectively connecting the shunt field exciting winding on one of said pole pieces in shunt across a source of electrical power supply and the series field exciting winding on the other of said pole pieces in series with said armature to provide respectively components of opposite polarity to said pole pieces providing a resultant cumulative excitation to said motor, said selective connecting means also being arranged to connect the other of said series field exciting windings and the other of said shunt field exciting windings in series circuit relation with each other and in shunt across said armature to provide substantially the same polarity components of excitation to said pole pieces.

2. A reversible motor having an armature member and a field member with a pair of shunt field exciting windings arranged respectively on a pair of pole pieces, a pair of series field exciting windings arranged respectively on said pole pieces, and means for selectively connecting the shunt field exciting winding on one of said pole pieces in shunt across a source of electrical power supply and the series field exciting winding on the other of said pole pieces in series with said armature to provide respectively components of opposite polarity to said pole pieces providing a resultant cumulative excitation to said motor, said selective connecting means also being arranged to connect the other of said series field exciting windings and the other of said shunt field exciting windings in series circuit relation with each other and in shunt across said armature to provide substantially the same polarity components of excitation to said pole pieces thereby providing substantially no resultant excitation by said latter shunt and series field exciting windings.

3. A reversible motor having an armature member and a field member with a pair of shunt field exciting windings arranged respectively on a pair of pole pieces, a pair of series field exciting windings arranged respectively on said pole pieces, and means for selectively connecting one of said shunt field exciting windings in shunt across a source of electrical power supply and a series field exciting winding in series with said armature to provide respectively opposite polarity components to said pole pieces providing a resultant cumulative excitation to said motor, and said selective connecting means also being arranged to connect the other of said series field exciting windings and the other of said shunt field exciting windings in series circuit relation with each other and in shunt across said armature to provide components of excitation of the same polarity to said pole pieces, said series field exciting windings being arranged to provide components of excitation cumulative to each other and said shunt field exciting windings being arranged to provide opposing components of excitation to each other.

4. A reversible motor having an armature member and a field member with a pair of shunt field exciting windings arranged respectively on a pair of pole pieces, a pair of series field exciting windings arranged respectively on said pole pieces, means for selectively connecting said field exciting windings in sets to provide opposite resultant excitation to said motor for opposite directions of rotation thereof, said selective connecting means being arranged to connect one of said shunt field exciting windings in shunt across a source of electrical power supply and to connect a series field exciting winding in series with said armature to provide respectively opposite polarity components to said pole pieces providing a resultant cumulative excitation to said motor, said selective connecting means also being arranged to connect the other of said series field exciting windings and the other of said shunt field exciting windings in series circuit relation with each other and in shunt across said armature to provide substantially equal and the same polarity components of excitation to said pole pieces thereby providing substantially no resultant excitation by said latter shunt and series field exciting windings.

5. A reversible motor having an armature member and a field member with a pair of shunt field exciting windings arranged respectively on a pair of pole pieces, a pair of series field exciting windings arranged respectively on said pole pieces, and means for selectively connecting the shunt field exciting winding on one of said pole pieces in shunt across a source of electrical power supply and a series field exciting winding on the other of said pole pieces in series with said armature to provide respectively opposite polarity components to said pole pieces providing a resultant cumulative excitation to said motor, said selective connecting means also being arranged to connect the other of said series field exciting windings and the other of said shunt field exciting windings in series circuit relation with each other and in shunt across said armature to provide substantially the same polarity components of excitation to said pole pieces, said shunt connected shunt field exciting winding and the series field exciting winding providing excitation to the same pole piece being arranged to provide excitation components of the same polarity and said series connected series field exciting winding and the shunt field exciting winding on the other of said pole pieces being arranged to provide excitation components of opposite polarity to each other when energized through said selective connecting means.

6. A reversible motor having an armature member and a field member with at least one pair of pole pieces, a shunt field exciting winding on each of said pole pieces, a series field exciting winding on each of said pole pieces, means for selectively connecting said field exciting windings in sets to provide opposite resultant excitation to said motor for opposite directions of rotation thereof, said selective connecting means being arranged to connect a shunt field exciting winding on one of said pair of pole pieces across a source of electrical power supply and a series field exciting winding on another pole piece of said pair of pole pieces in series with said armature and arranged to provide a resultant cumulative excitation to said motor with the series field exciting winding on said one pole piece and the shunt field exciting winding on said other pole piece connected in series circuit relation with each other and in shunt across said armature and arranged on said pole pieces to provide substantially equal and the same polarity components of excitation to each of said two pole pieces thereby providing substantially no resultant excitation by said latter shunt and series field exciting windings to said motor, said shunt connected shunt field exciting winding and said series field exciting winding on said one pole piece being arranged to provide excitation of the same polarity to said one pole piece and said series connected series field exciting winding and said shunt field exciting winding on said other pole piece being arranged to provide excitation of opposite polarity to said other pole piece when energized through said selective connecting means.

7. A reversible motor having an armature and a field member with at least a pair of pole pieces, a shunt field exciting winding on each of said pole pieces, a series field exciting winding on each of said pole pieces, means for connecting a terminal of the shunt field exciting winding on each of said pole pieces in series with a terminal of the series field exciting winding on the other of said pole pieces and connecting together the other corresponding terminals of said shunt and of said series field exciting windings forming two parallel circuits, means for connecting one terminal of said armature and one terminal of each of said two parallel circuits to one side of a source of electric power supply, means for connecting the other terminal of each of said two parallel circuits in series with said armature, means for selectively connecting the connection between said shunt and series field exciting windings of said two parallel circuits to the other side of said source of electric power supply for selectively providing opposite resultant excitations to said motor for opposite directions of rotation thereof, and said selective connecting means being adapted to energize one of said shunt field exciting windings in shunt across the source of electrical power supply and the series field exciting winding of the corresponding parallel circuit in series with said armature for providing a resultant cumulative excitation to said pole pieces of said motor and for energizing the field exciting windings of the other parallel circuit to provide components of excitation of the same polarity to all of said pole pieces with substantially no resultant excitation therefrom to said motor.

8. A reversible motor having an armature and a field member with at least a pair of pole pieces, a shunt field exciting winding on each of said pole pieces, a series field exciting winding on each of said pole pieces, means for connecting a terminal of the shunt field exciting winding on each of said pole pieces in series with a terminal of the series field exciting winding on the other of said pole pieces and connecting together the other corresponding terminals of said shunt and of said series field exciting windings forming two parallel circuits, means for connecting one terminal of said armature and one terminal of each of said two parallel circuits formed by connected terminals of said shunt field exciting windings to one side of a source of electric power supply, means for connecting the other terminal of each of said two parallel circuits formed by connected terminals of said series field exciting windings in series with said armature, means for selectively connecting the connection between said shunt and series field exciting windings of said two parallel circuits to the other side of said source of electric power supply for selectively providing opposite resultant excitations to said motor for opposite directions of rotation thereof, and said selective connecting means being adapted to energize one of said shunt field exciting windings in shunt across the source of electrical power supply and the series field exciting winding of the corresponding parallel circuit in series with said armature for providing a resultant cumulative excitation to said pole pieces of said motor and for energizing the field exciting windings of the other parallel circuit to provide components of excitation of the same polarity to all of said pole pieces with minimum resultant excitation therefrom to said motor.

9. A reversible motor having an armature and a field member with at least a pair of pole pieces, a shunt field exciting winding on each of said pole pieces, a series field exciting winding on each of said pole pieces, means for connecting a terminal of the shunt field exciting winding on each of said pole pieces in series with a terminal of the series field exciting winding on the other of said pole pieces and connecting together the other corresponding terminals of said shunt and of said series field exciting windings forming two parallel circuits, means for connecting one terminal of said armature and one terminal of each of said two parallel circuits formed by connected terminals of said shunt field exciting windings to one side of a source of electric power supply, means for connecting the other terminal of each of said two parallel circuits formed by connected terminals of said series field exciting windings in series with said armature, means for selectively connecting the connection between said shunt and series field exciting windings of said two parallel circuits to the other side of said source of electric power supply for selectively providing opposite resultant excitations to said motor for opposite directions of rotation thereof, said selective connecting means being adapted to energize one of said shunt field exciting windings in shunt across the source of electrical power supply and the series field exciting winding of the corresponding parallel circuit in series with said armature for providing a resultant cumulative excitation to said pole pieces of said motor and for energizing the field exciting windings of the other parallel circuit to provide components of excitation of the same polarity to all of said pole pieces with substantially no resultant excitation therefrom to said motor, and said shunt connected field exciting winding and the series field exciting winding on the same pole piece being arranged to provide excitation of the same polarity and said series connected series field exciting winding and the shunt field exciting winding on the other pole piece being arranged to provide excitation of opposite polarity to said other pole piece when energized through said selective connecting means.

ROBERT F. JOHNSON.

REFERENCES CITED

The following references are of record in the file of this patent:

UNITED STATES PATENTS

| Number | Name | Date |
| --- | --- | --- |
| 1,070,647 | Whittingham | Aug. 19, 1913 |
| 1,103,528 | Morse | July 14, 1914 |
| 2,424,337 | Snyder | July 22, 1947 |